United States Patent
Gradu

(10) Patent No.: US 7,238,140 B2
(45) Date of Patent: Jul. 3, 2007

(54) DIFFERENTIAL WITH TORQUE VECTORING CAPABILITIES

(75) Inventor: Mircea Gradu, Massillon, OH (US)

(73) Assignee: The Timken Company, Canton, OH (US)

( * ) Notice: Subject to any disclaimer, the term of this patent is extended or adjusted under 35 U.S.C. 154(b) by 175 days.

(21) Appl. No.: 11/045,243

(22) Filed: Jan. 28, 2005

(65) Prior Publication Data

US 2006/0025273 A1 Feb. 2, 2006

Related U.S. Application Data

(63) Continuation-in-part of application No. 10/901,657, filed on Jul. 29, 2004, now abandoned.

(51) Int. Cl.
*F16H 48/06* (2006.01)
(52) U.S. Cl. .................................... 475/221
(58) Field of Classification Search ............. 475/221, 475/224, 225
See application file for complete search history.

(56) References Cited

U.S. PATENT DOCUMENTS

| 5,135,071 | A | 8/1992 | Shibahata et al. | |
| 6,120,407 | A | 9/2000 | Mimura | |
| 6,932,734 | B2 * | 8/2005 | Hwa et al. | 475/221 |

FOREIGN PATENT DOCUMENTS

WO WO 0209966 A1 2/2002

OTHER PUBLICATIONS

SAE International, Paper 2004-01-2053, John Park and William J. Kroppe, Dana Corporation entitled "Dana Torque Vectoring Differential Dynamic Trak™", May 4-6, 2004.
Yuichi Ushiroda, Kaoru Sawase, Naoki Takahashi, Keiji Suzuki; Kunihiro Manage; Technical Review, 2003 No. 15, pp. 73-76, "Development of Super AYC".

* cited by examiner

*Primary Examiner*—Dirk Wright
(74) *Attorney, Agent, or Firm*—Polster, Lieder, Woodruff & Lucchesi, L.C.

(57) ABSTRACT

A differential for delivering vectored torque to left and right axle shafts that rotate about an axis includes a cage which rotates about the axis as a consequence of torque applied to it. The cage contains gearing that transfers the torque to the axle shafts while accommodating for variances in angular velocity between the axle shafts. In addition, the differential has left and right torque diverters, each of which includes a ring gear on the cage, a sun gear on the axle shaft with which it is identified, planet gears between the ring and sun gears, and a carrier for providing axes about which the planet gears rotate. Each diverter also has a brake which resists rotation of the carrier for the diverter and thereby causes torque to transfer from the cage to the axle shaft while bypassing the gearing. The brakes control the torque delivered to the axle shafts, so the differential has the capacity to vector the torque applied to its cage.

18 Claims, 6 Drawing Sheets

------- TORQUE FLOW

LEFT                    RIGHT

--------- CONVENTIONAL TORQUE FLOW
—-—-—- VECTORED TORQUE FLOW

LEFT                    RIGHT

DIFFERENTIAL WITH TORQUE VECTORING CAPABILITIES

CROSS-REFERENCE TO RELATED APPLICATIONS

This application is a continuation-in-part of U.S. patent application Ser. No. 10/901,657, filed Jul. 29, 2004 now abandoned, from which priority is claimed.

STATEMENT REGARDING FEDERALLY SPONSORED RESEARCH

Not applicable.

BACKGROUND OF THE INVENTION

This invention relates in general to differentials for automotive vehicles and, more particularly, to a differential that vectors the torque transferred through it.

When a wheeled automotive vehicle negotiates a turn, the wheels at the outside of the turn rotate faster than the wheels at the inside of the turn. A differential between the drive wheels on each side of the vehicle compensates for the variance in speed between the two drive wheels, but a conventional differential divides the torque generally evenly between those drive wheels. However, for optimum control of the vehicle the drive wheel on the outside of the turn should deliver more torque than the corresponding drive wheel on the inside of the turn. In effect, the increased torque applied to the drive wheel on the outside of the turn helps propel and steer the vehicle around the turn, and this is particularly beneficial in turns negotiated at high speeds.

Moreover, traction may vary between the drive wheels at opposite ends of the differential. If the traction under one of the drive wheels is poor enough, such as on ice, the differential distributes the torque such that the wheel simply spins, while the other wheel with better traction remains at rest. To be sure, limited-slip differentials exist, but that type of differential tends to bring both drive wheels to the same velocity. Where traction is good, this characteristic of limited-slip differentials detracts from the handling of a vehicle negotiating turns at high speeds.

DETAILED DESCRIPTION OF THE INVENTION

Figure 1:
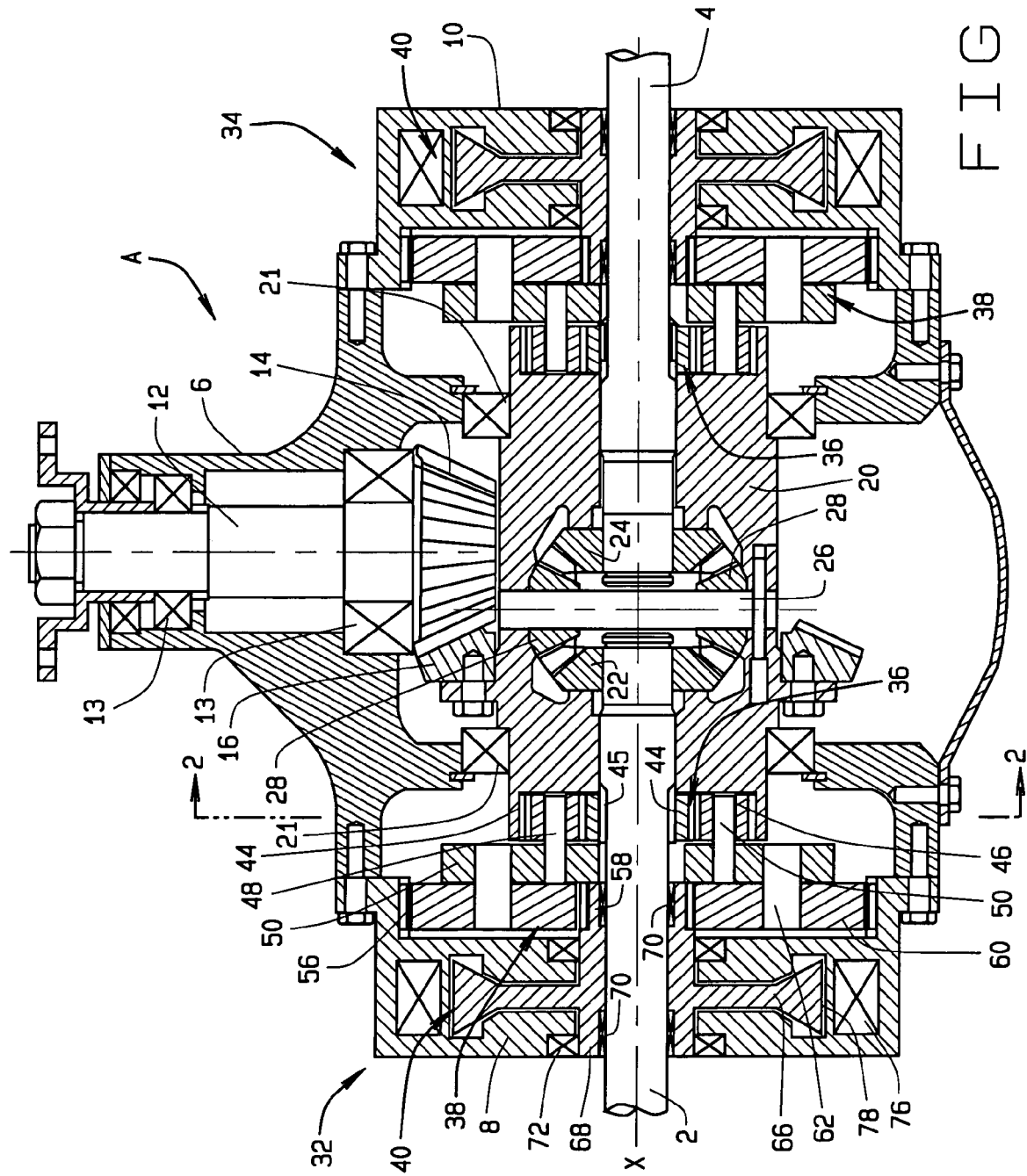
FIG. 1 is a sectional view of a differential constructed in accordance with and embodying the present invention.
Figure 2:
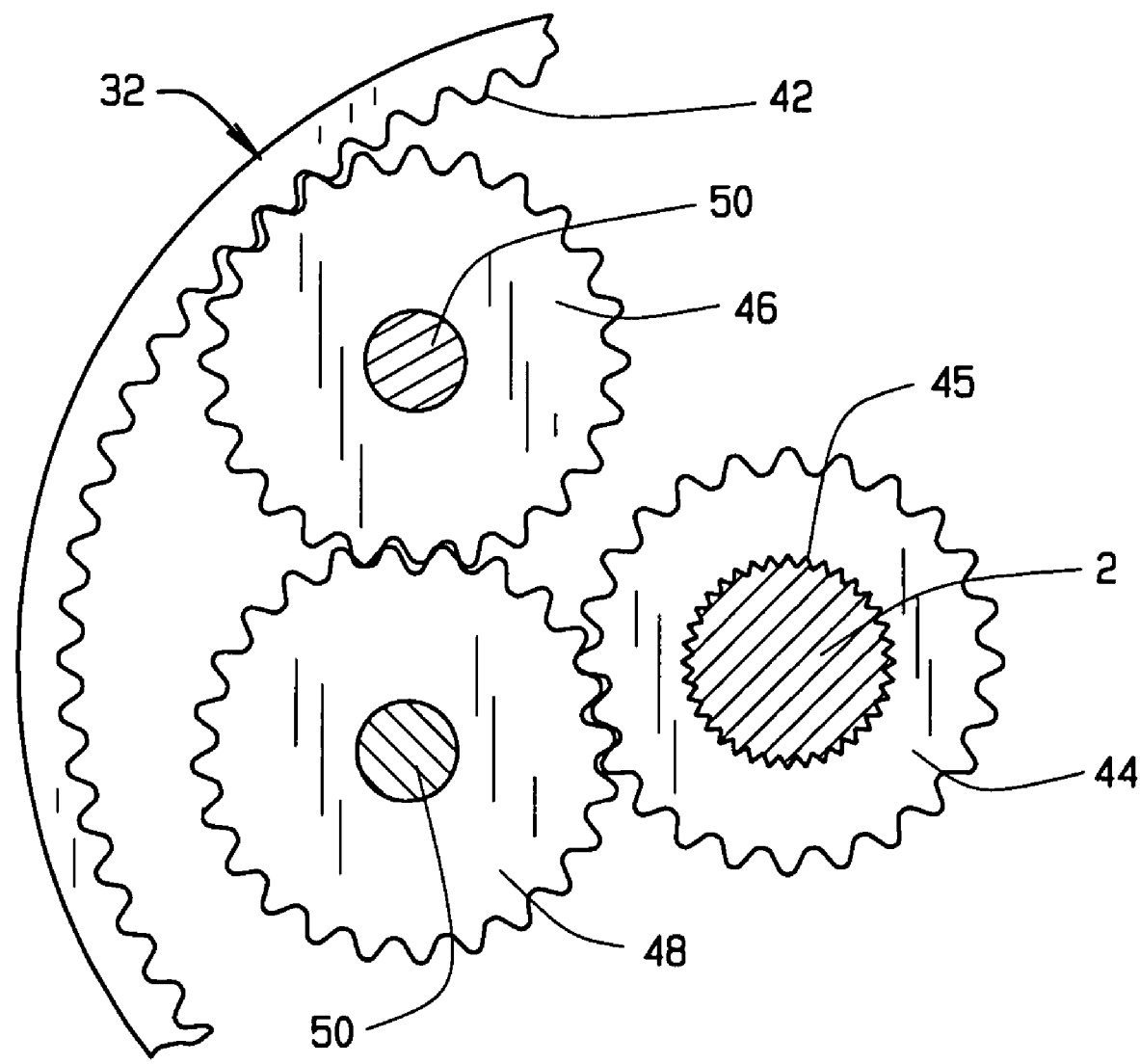
FIG. 2 is a fragmentary sectional view taken along line 2-2 of FIG. 1.
Figure 3:
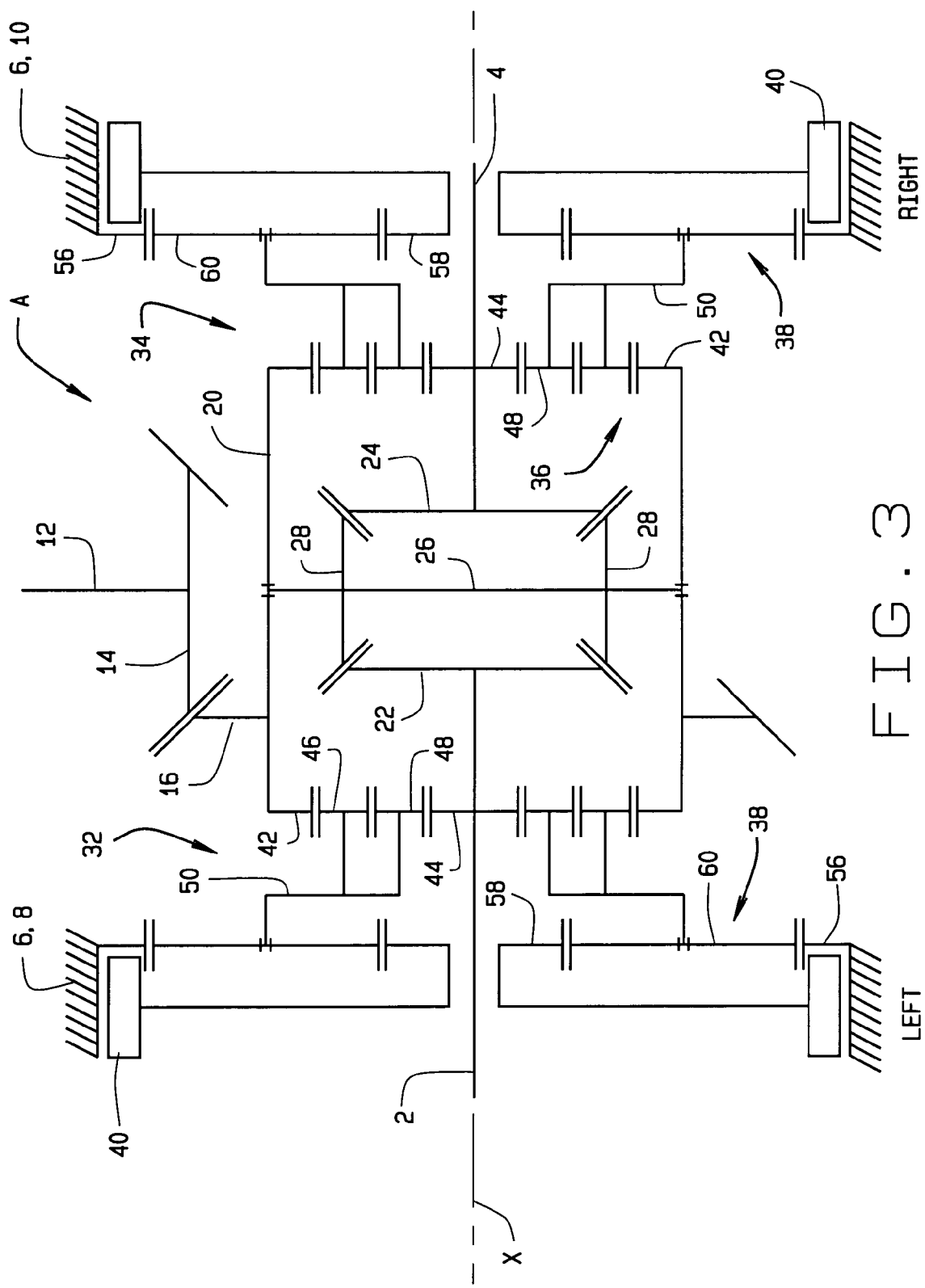
FIG. 3 is a kinematic diagram of the differential.
Figure 4:
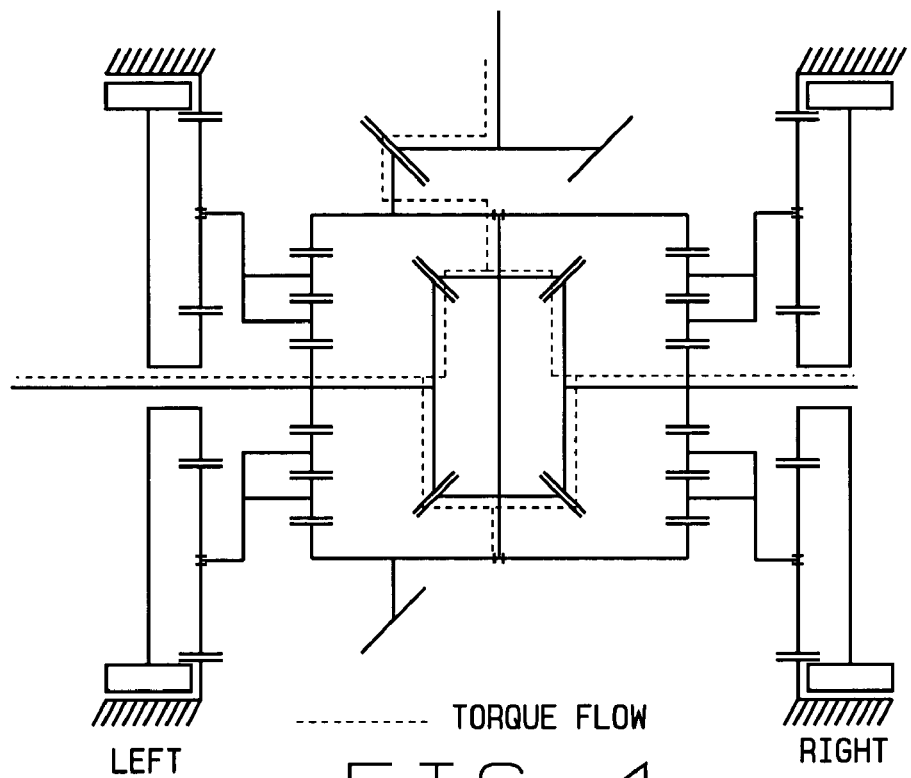
FIG. 4 is kinematic diagram of the differential showing the flow path of torque with its torque vectoring diverters inactivate.

Referring now to the drawings, a differential A (FIGS. 1–5) for an automotive vehicle distributes torque produced by the engine of the vehicle to two axle shafts 2 and 4 which rotate about a major axis X and are coupled to road wheels located, respectively, at the left and right sides of the vehicle. The differential A has the capacity to selectively vector the torque delivered to the two shafts 2 and 4, so that one of the shafts 2 or 4 may transfer greater torque than the other. This enhances control of the vehicle.

The differential A includes a housing 6 which contains the working components of the device and includes a left and right end closures 8 and 10. The left axle shaft 2 projects out of the left closure 2, whereas the right axle shaft 4 projects out of the right closure 10.

The differential A can function as a conventional differential and often does. To this end, it has (FIGS. 1 & 3) a pinion shaft 12 that rotates in the housing 6 on bearings 13. The pinion shaft 12 carries a beveled drive pinion 14 at its inner end. The opposite or outer end of the pinion shaft 12 is coupled with the engine of the vehicle through the transmission of the vehicle. The pinion 14 meshes with a beveled outer ring gear 16 which is bolted firmly to a differential case or cage 20 that rotates about the axis X on bearings 21 located between the cage 20 and the housing 10. The cage 20 contains gearing in the form of left and right beveled side gears 22 and 24 which are capable of rotating in the cage 20 and also with the cage 20 about the axis X. The left gear 22 is coupled to the left axle shaft 2, while the right gear 24 is coupled to the right axle shaft 4. In addition to the two side gears 22 and 24, the cage 20 carries a cross pin 26, the axis of which is perpendicular to the axis X. The cross pin 26 is fitted with a pair of intervening beveled pinions 28 which mesh with the left and right side gears 22 and 24 and are also part of the gearing.

Thus, when the engine applies torque to and rotates the pinion shaft 12, the pinion 14 on it rotates the ring gear 16 and the cage 20 to which it is secured. The cage 20 in turn causes the cross pin 26 to revolve about the axis X, and the revolving cross pin 26 causes the beveled pinions 28 that are on it to orbit about the axis X. The orbiting beveled pinions 28, being engaged with the left and right side gears 22 and 24, rotate those gears which in turn rotate the axle shafts 2 and 4. Should one of the axle shafts 2 or 4 rotate faster than the other, as when negotiating a turn, the beveled pinions 28 will rotate on the cross shaft 26, but will still transfer torque to the left and right side gears 22 and 24 and to the axle shafts 2 and 4 to which the gears 22 and 24 are connected.

But the differential A also has the capacity to vector torque between the two axle shafts 2 and 4, that is to say, to selectively distribute the torque that is applied at the pinion shaft 12 between the two axle shafts 2 and 4. To this end, the differential A is equipped with (FIGS. 1 & 3) a left torque diverter 32 and a right torque diverter 34, which are located within the housing 4 at the left enclosure 8 and right enclosure 10, respectively, of the housing 6. The left torque diverter 32, when energized, is capable of diverting additional torque from the ring gear 16 to the left axle shaft 2. The right torque diverter 34, when energized, is capable of diverting additional torque from the ring gear 16 to the right axle shaft 4. Each torque diverter 32 and 34 basically includes a primary planetary set 36, a secondary planetary set 38, and a magnetic particle brake 40.

The primary planetary set 36 of each diverter 32 and 34 has a ring gear 42 that is attached to the cage 20. Indeed, it may be formed integral with the cage 20. The primary set 36 also includes a sun gear 44 coupled through a spline 45 with that axle shaft 2 or 4 that extends from its end of the cage 20. Thus, the sun gear 44 for the primary planetary set 36 of the left diverter 32 is connected to the left axle shaft 2 and to the left beveled gear 22 in the cage 20, as well, all such that the sun gear 44, the beveled gear 22 and the axle shaft 2 rotate in unison at the same angular velocity. The sun gear 44 for the primary planetary set 36 of the right diverter 34 is connected to the right axle shaft 4 and to the right beveled gear 24, such that all three rotate in unison at the same angular velocity. Each primary planetary set 36 also has (FIG. 2) planet gears 46 and 48 located between its ring gear 42 and its sun gear 44. They rotate about pins 50 which form part of a carrier 52. The planet gears 46 mesh with the ring gear 42, but not the sun gear 44, whereas the planet gears 48 mesh with the sun gear 44 but not the ring gear 42. Moreover, the planet gears 46 and 48 are arranged in pairs, with the planet gears 46 and 48 of each pair meshing with each other. As a consequence, any torque transferred from the ring gear 42 to the sun gear 44 imparts rotation to the shaft 2 or 4 in the direction of rotation for the cage 20. This enables the pitch diameters of the ring gear 42 and sun gear 44 to be somewhat similar, although with that of the sun gear 44 being smaller than that of the ring gear 42, and this, in turn, enables the sun gear 44 and its axle shaft 2 or 4 to overspeed with respect to the ring gear 42 and cage 20.

Each secondary planetary set 38 has a ring gear 56 attached to the closure 8 or 10 at its end of the cage 20, such that it does not rotate with respect to the housing 6. Indeed, the ring gears 56 may be formed integral with the end closures 8 and 10. Each secondary set 38 also includes a sun gear 58 connected to the magnetic particle brake 40 for its diverter 32 or 34. In addition, the secondary planetary set 38 has planet gears 60 which are located between and engaged with the ring gear 56 and the sun gear 58. The secondary planetary set 38 shares the carrier 52 with its primary set 36, in that the carrier 52 has additional pins 62 which provide parallel axes about which the planet gears 60 of the secondary set 38 rotate. In that sense, the carrier 52 couples the two planetary sets 36 and 38.

The magnetic particle brake 40 for the left torque diverter 32 lies within the left closure 8 for the housing 6, whereas the magnetic particle brake 40 for the right torque diverter 34 lies within the right closure 10. Each brake 40 includes a rotor 66 having a sleeve 68 that rotates on the axle shaft 2 or 4 that extends through the end closure 8 or 10 in which the brake 40 is located. Indeed, the sleeve 62 and shaft 2 or 4 rotate relative to each other on needle bearings 70 located between them. Actually, the sun gear 58 for the secondary set 38 of each diverter 32 and 34 may be formed integral with the sleeve 68 for the brake 40 of that diverter 32 or 34. The sleeve 68, in turn, rotates in bearing 72 located between it and the closure 8 or 10 within which it is located. Much of the rotor 66 lies radially beyond its sleeve 68. Each brake 40 also includes an electrical coil 76 that is embedded in its end closure 8 or 10, and it encircles the rotor 66. The end closure 8 or 10 and the coil 76 embedded within it form the stator for the brake 40. A small annular gap exists around the periphery of the rotor 66 between it and the coil 76, and this gap contains particles 78 that are capable of being magnetized.

When the coil 76 is energized, the brake 40 resists rotation of the rotor 66 and likewise rotation of the sun gear 58 that is on the sleeve 68 of the rotor 66. The torque applied to the rotor 66 varies almost linearly with the current, and as a consequence the two brakes 40 are easily controlled as are the torque diverters 32 and 34 of which they are a part.

Basically, the magnetic particle brake 40 for each torque diverter 34, 36 lies between the sun gear 58 of the secondary planetary set 38 for the diverter 34 or 36 and the housing 10. When applied, it resists rotation of the sun gear 58, but the sun gear 58 continues to rotate despite the resistance. When fully de-energized, the magnetic particle brake 40 offers essentially no resistance to the sun gear 58 and the planet gears 60 simply rotate and orbit between the ring gear 52 and sun gear 58. The carrier 52 rotates and the planet gears 46 of the primary planetary set 38 orbit as well.

Normally, the differential A operates with both of its magnetic particle brakes 40 de-energized, and this holds particularly true when the vehicle travels straight. Under these circumstances the torque supplied at the pinion shaft 12 is divided equally between the left and right axle shafts 2 and 4 and the road wheels that they drive. This does not differ from a conventional differential. Indeed, the differential A operates essentially as a conventional differential, with all of the torque and power passing (FIG. 4) from the ring gear 16 to the differential cage 20 and thence to the cross pin 26. While the cross pin 26 revolves around the axis X, the beveled pinions 28 do not rotate on the cross pin 26. They simply turn the left and right beveled side gears 22 and 24 at the velocity of the cage 20 and cross pin 26, and the beveled side gears 22 and 24 rotate the axle shafts 2 and 4, respectively, at the same angular velocity. With the brakes 40 fully released the left and right torque diverters 32 and 34 transfer no torque of any consequence and otherwise do not affect the operation of the differential A.

However, when the vehicle enters a turn, particularly at high speed, the magnetic particle brake 40 for the diverter 32 or 34 that is dedicated to the wheel on the outside of the turn should be energized to vector the torque such that more is delivered to that wheel. When the brake 40 of the diverter 32 or 34 for the axle shaft 2 or 4 on the outside of the turn is energized and the brake 40 thus applied, it seeks to resist rotation of the sun gear 58 in the secondary planetary set 38 of that diverter 32 or 34. The sun gear 58 in turn seeks to restrain orbiting of the planet gears 60, and they in turn seek to impede rotation of the carrier 52. If the brake 40 were fully released, the planet gears 46 and 48 of the primary planetary set 36 would simply spin freely between the beveled ring gear 42 and sun gear 44 of the set 36, but as a consequence of the restraint exerted on the carrier 52 by the brake 40, a reactive torque is applied to the orbiting planet gears 46 and 48 of the primary set 36. This causes the gears 46 and 48 to divert torque, the torque flow being (FIG. 5) from the cage 20 and ring gear 42, through the planet gears 46 and 48 to the sun gear 44 and thence into the axle shaft 2 or 4. The greater the braking effort exerted by the brake 40, the greater the diversion of torque.

The extent to which either brake 40 is applied depends on a number of conditions, all of which may be monitored by sensors on the vehicle and processed through a processor to control the current which operates the magnetic particle brakes 40. Among the conditions monitored are the speed of the vehicle, rate of yaw, the lateral acceleration of the vehicle, the steering angle, the wheel slip, longitudinal engine and transmission operating parameters, and the temperature of the brakes 40, to name some.

Figure 5:
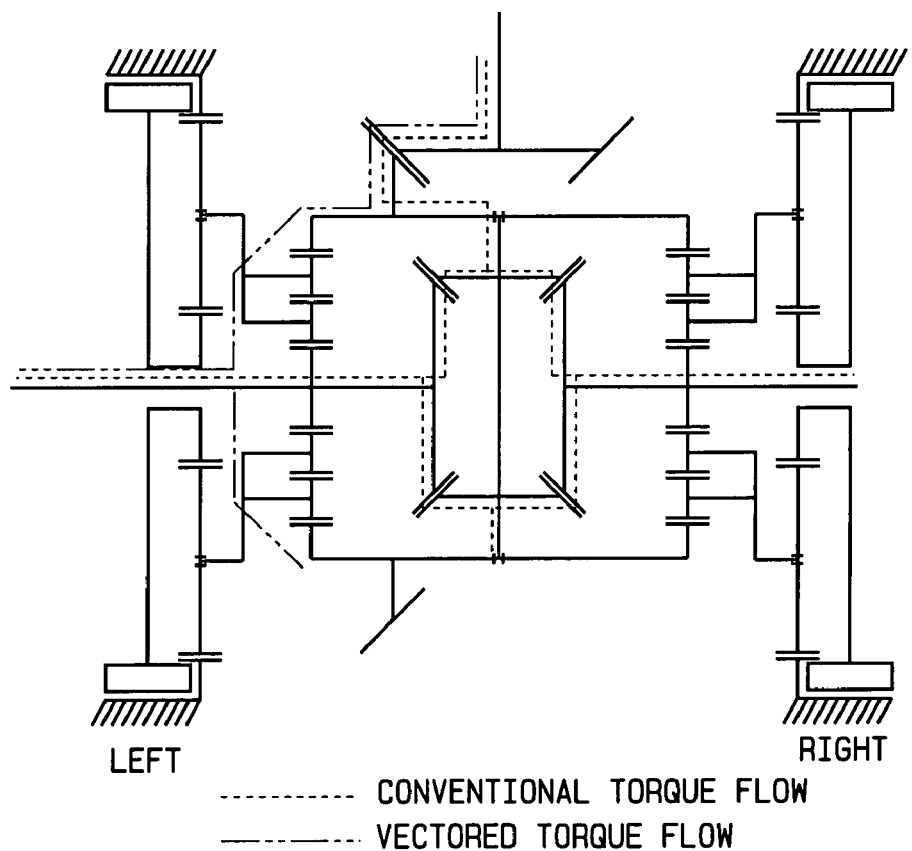
FIG. 5 is a kinematic diagram of the differential showing the flow of torque with its left torque vectoring diverter activated.

For example, if the vehicle enters a right turn, the road wheel and axle shaft 2 on the left side of the vehicle will rotate faster than the road wheel and axle shaft 4 on the right side of the vehicle. The brake 40 of the left diverter 32 is energized to resist rotation of the sun gear 58 in the secondary planetary set 38. The planet gears 60 of the secondary set 38 likewise experience the resistance to rotation as does the carrier 52. In effect, the secondary planetary set 38 serves as a torque multiplier, exerting considerably more torque on the carrier 52 than the brake 40 exerts on the sun gear 52. The planet gears 46 and 48 of the primary set 36, instead of idling freely between the ring gear 42 and sun gear 44 of that set, now, owing to the resistance to orbiting exerted by the carrier 52, divert torque from the cage 20 to the sun gear 58 and the left axle shaft 2, so that more torque is applied to the left axle shaft 2 than to the right axle shaft 4 (FIG. 5). In other words, the ring gear 42, through the planet gears 46 and 48, actually drives the sun gear 44 and the left axle shaft 2 to which it is connected at the greater velocity of the axle shaft 2. Thus, the left diverter 32, in effect, functions as an overspeed mechanism for the left axle shaft 2.

Slippage occurs within the brake 40 of the left diverter 32. Generally speaking, the greater the resistance to rotation imposed by the brake 40, the greater the torque transferred through the left diverter 32 to the left axle shaft 2. While the brake 40 of the left diverter 32 may be energized in a right turn, the brake 40 at the right diverter 34 is not.

When negotiating a left turn, the magnetic particle brake 40 of the right diverter 34 is applied in a like manner, while the brake 40 of the left diverter 32 remains fully released. Thus, additional torque transfers to the right axle shaft 4.

Figure 6:
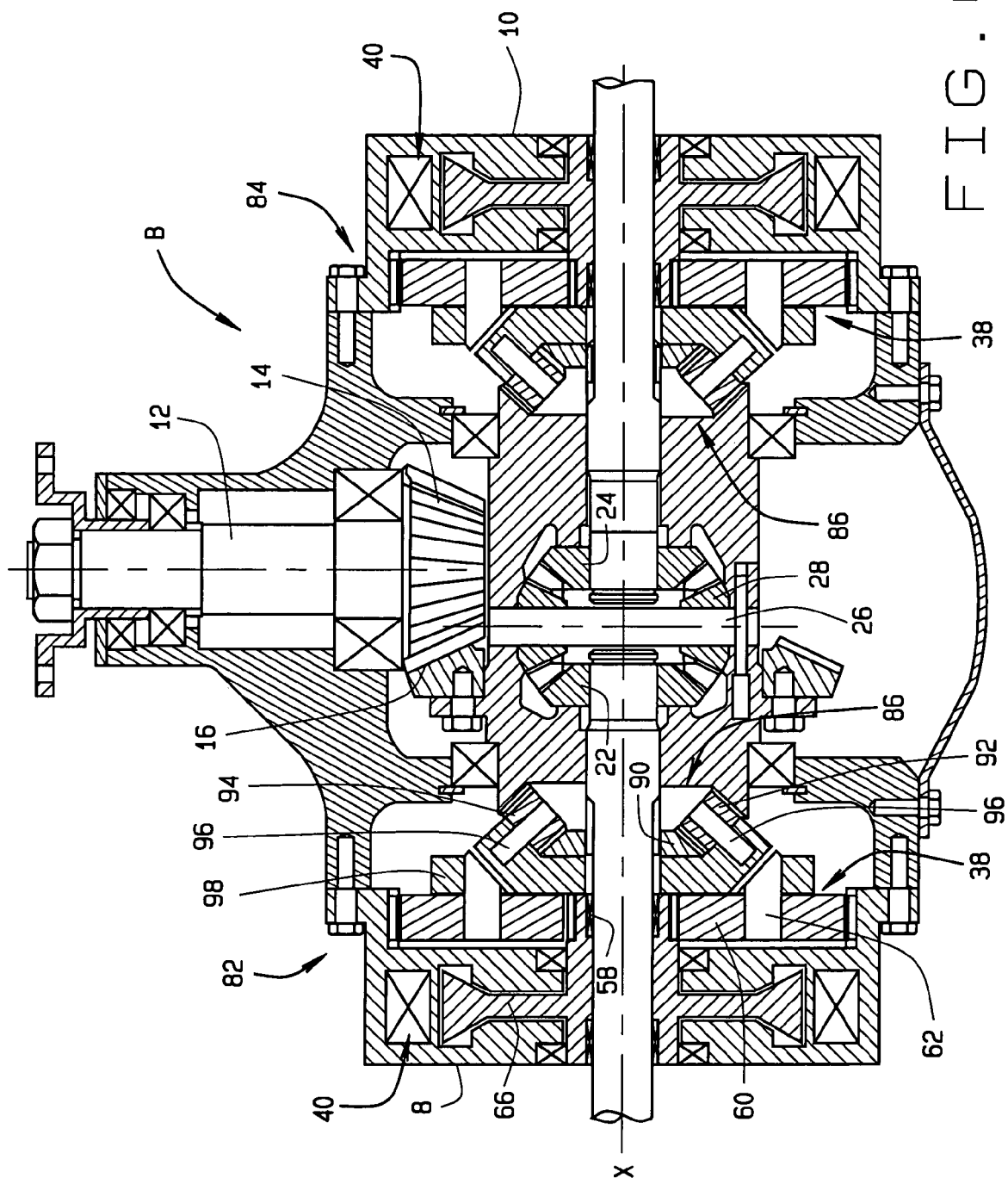
FIG. 6 is a sectional view of a modified differential.
Figure 7:
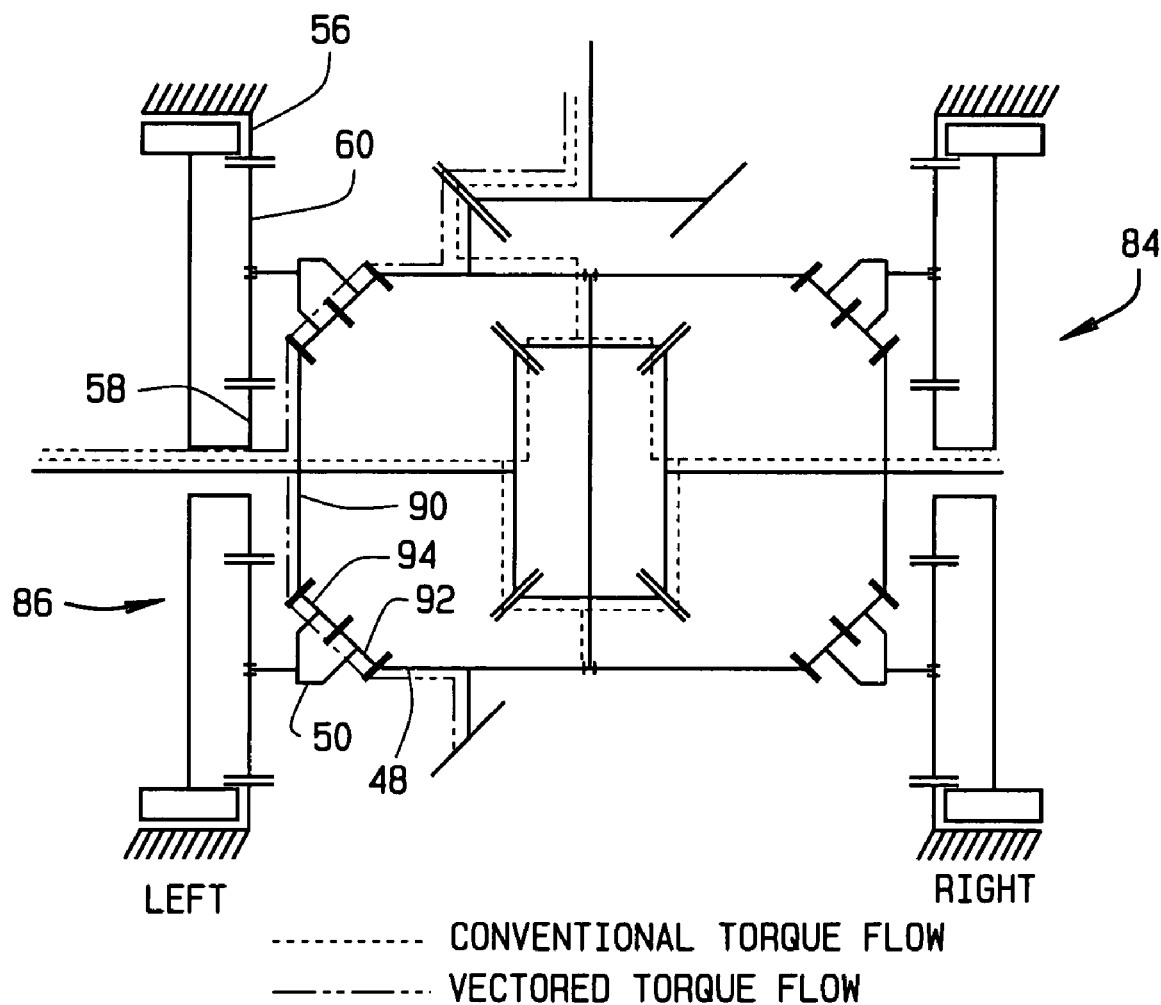
FIG. 7 is a kinematic diagram showing the flow of torque in the modified differential of FIG. 6 with left torque vectoring diverter activated.

A modified differential B (FIGS. 6 & 7) is similar to the differential A, but utilizes left and right torque diverters 82 and 84 that differ slightly from the diverters 32 and 34 in differential A. To be sure, each torque diverter 82 and 84 in the differential B has a secondary planetary set 38 and a magnetic particle brake 40. The differences reside in a primary planetary set 86 which is interposed between the cage 20 and the secondary planetary set 38.

The primary planetary set 86 for each torque diverter 82 and 84 includes (FIG. 6) a beveled ring gear 88, on the cage 20 and a beveled sun gear 90 on the shaft 2 or 4. The ring gear 88 encircles one of the axle shafts 2 and 4 but rotates with the cage 20 at the speed of the cage 20, whereas the sun gear 90 is coupled to that axle shaft 2 or 4 through a spline. Between the ring gear 88 and the sun gear 90 are planet gears 92 and 94 which are arranged in pairs, there being a planet gear 92 and a planet gear 94 in each pair. The planet gears 92 and 94 rotate about pins 96 which project from a carrier 98, the very same carrier from which the pins 62 for the secondary planetary set 38 project, but are oblique to the axis X. The planetary gears 92 mesh with the ring gear 88, but not with the sun gear 90. The planetary gears 94 mesh with the sun gear 90 but not with ring gear 88. The planetary gears 92 and 94, of each pair mesh with each other.

The differential B operates essentially the same as the differential A. When the vehicle travels straight, the brakes 40 of both torque diverters 82 and 84 are release, that is to say the coils 76 carry no current. As a consequence, the differential B operates essentially as a conventional differential, in which event the sun gear 90 of each primary planetary set 86 rotates at the speed of the cage 20 and the planet gears 92 and 94 simply orbit without rotating, about their pins 96. The planet gears 60 of the secondary set 38, being carried around the axis X by the carrier 98, will orbit and will further rotate, driving the sun gear 58 and the brake rotor 66 that is connected to it. Should the vehicle enter a right turn, the left axle shaft 2 on the outside of the turn will rotate faster than the cage 20, so the planet gears 92 and 94 in the primary planetary set 86 in the left diverter 82 will rotate between the ring gear 88 and the sun gear 90. If the brake 40 for the left diverter 82 is energized, more torque will flow to the left axle shaft 2. A similar sequence occurs for a left turn, with more torque flowing through the right diverter 84 to the right axle shaft 4.

The differentials A and B may also be used to divert torque to a drive wheel that has the best traction, simply by energizing the magnetic particle brake 40 on the side of the differential A or B at which that wheel is located. For example, if the right wheel loses traction on ice and seeks to spin freely, while the left wheel retains relatively good traction, the magnetic particle brake 40 of the left diverter 32 or 82 may be energized to divert more torque to the left axle shaft 2 and the drive wheel to which it is coupled. On the other hand, if both drive wheels experience poor or reduced traction, the magnetic particle brake 40 of both diverters 32 and 34 should be energized, so that torque is transferred through both diverters 82 and 84 to the axle shafts 2 and 4 without having one axle shaft 2 or 4 break loose and spin under slightly reduced traction of the wheel coupled with that shaft.

The magnetic particle brakes 40 provide excellent control. But other brakes are suitable as well. For example, a friction-type brake operated by a pressurized fluid or by a solenoid will suffice. Moreover, the braking may occur at the carriers 52 or 98 for the primary planetary sets 36 or 86 without the intervening secondary planetary sets 38, and the torque amplification that they provide. In short the diverters 32 and 34 or the diverters 82 and 84 need not have the secondary planetary sets 38. Also, the ring gear 50 need not be beveled, but may have straight teeth and be driven by a pinion rotating about a parallel axis as in the transaxle of a front wheel drive vehicle. Moreover, the axle shafts 2 and 4 need not extend out to drive wheels, but may be stub shafts connected to the drive wheels through more shafts and constant velocity joints, as when the drive wheels are independently suspended.

The invention claimed is:

1. A differential for distributing torque to left and right axle shafts of an automotive vehicle; said differential comprising:

a cage which rotates about a major axis under torque that is applied;

gearing within the cage for distributing at least some of the torque that is applied to the cage between the axle shafts while accommodating variances in velocity between the axle shafts;

a first planetary set having a ring gear connected to the cage, a sun gear coupled with the left axle shaft for rotation with the left axle shaft at the same angular velocity, planet gears located between and engaged with the ring and sun gears, and a carrier providing axes about which the planet gears rotate;

a first brake coupled with the carrier of the first planetary set to resist rotation of that carrier;

a second planetary set having a ring gear connected to the cage, a sun gear coupled with the right axle shaft for rotation with the right axle shaft at the same angular velocity, planet gears located between and engaged with the ring and sun gears, and a carrier providing axes about which the planet gears rotate; and a second brake coupled with the carrier of the second planetary set to resist rotation of that carrier;

whereby when either one of the first or second brakes are applied to resist rotation of the carrier to which that brake is coupled, some of the torque will transfer through the planetary set of which the carrier is a part.

2. A differential according to claim 1 wherein the cage and axle shafts rotate about a common axis.

3. A differential according to claim 2 wherein the gearing includes first beveled gear which rotates with the first axle shaft about the major axis, a second beveled gear which rotates with the second axle shaft about the major axis, and a third beveled gear that meshes with the first and second beveled gears and is capable of rotating in the cage about an axis that is perpendicular to the major axis.

4. A differential according to claim 2 wherein the ring and sun gears of the first and second planetary sets are beveled gears, and the planetary gears rotate about axes that are oblique to the major axis.

5. A differential according to claim 2 and further comprising: a third planetary set located between the first brake and the first planetary set; and a fourth planetary set located between the second brake and the second planetary set.

6. A differential according to claim 5 wherein the third and fourth planetary sets each include a ring gear, a sun gear, and a planet gear located between and engaged with the ring and sun gears; wherein the ring gears of the third and fourth planetary sets are fixed against rotation; wherein the sun gear of the third planetary set is connected to the first brake; wherein the planet gear of the third planetary set is connected to the carrier for the first planetary set; wherein the sun gear for the fourth planetary set is connected to the second brake; and wherein the planet gear for the fourth planetary set is connected to the carrier for the second planetary set.

7. A differential according to claim 6 wherein the first and second brakes are magnetic particle brakes.

8. A differential according to claim 2 wherein the first and second brakes are magnetic particle brakes.

9. A differential according to claim 2 and further comprising an outer ring gear fastened to the cage with its axis being the major axis and with torque being delivered to the cage through the outer ring gear.

10. A differential for transferring torque from a drive gear, said differential comprising:
 a housing;
 left and right axle shafts in the housing;
 a cage rotatable in the housing about the major axis;
 an outer ring gear on the cage for enabling torque to be applied to the cage;
 left and right side gears in the cage on the left and right axle shafts, respectively, for rotation with the left and right axle shafts, respectively;
 a pinion mounted in the cage for rotation about an axis that is fixed with respect to the cage and perpendicular to the major axis, the pinion meshing with the left and right side gears, whereby torque is transferred from the cage through the pinion and the left and right side gears;
 a left torque diverter including a ring gear on the cage, a sun gear connected to the left axle shaft for rotation with it, planet gears located between and engaged with the ring and sun gears, a carrier providing axes about which the planet gears rotate, and a left brake for resisting rotation of the carrier so that torque will transfer from the cage to the left axle shaft through the ring gear, planet gears, and sun gear of the left diverter; and
 a right torque diverter including a ring gear on the cage, a sun gear connected to the right axle shaft for rotation with the right axle shaft, planet gears located between and engaged with the ring and sun gears, a carrier providing axes about which the planet gears rotate, and a right brake for resisting rotation of the carrier so that torque will transfer from the cage to the right axle shaft through the ring gear, planet gears and sun gear of the right diverter.

11. A differential according to claim 10 wherein the left torque diverter also includes a secondary planetary set having a ring gear fixed in position with respect to the housing, a sun gear, and planet gears, the axes of which are provided by the carrier for the left diverter; wherein the brake of the left diverter is between the housing and sun gear of the secondary planetary set; wherein the right torque diverter also includes a secondary planetary set having a ring gear fixed in position with respect to the housing, a sun gear, and planet gears, the axes of which are provided by the carrier for the right diverter; and wherein the brake of the right diverter is between the housing and sun gear of the secondary planetary set.

12. A differential according to claim 11 wherein the brakes are magnetic particle brakes.

13. A differential according to claim 11 wherein the ring and sun gears of the primary planetary sets for the torque diverters are beveled gears.

14. A differential according to claim 11 wherein the housing includes left and right end closures; wherein the ring gears for the secondary planetary sets are in the end closures; and wherein the brakes have rotors to which the sun gears of the secondary planetary sets are attached.

15. A differential comprising;
 a housing;
 left and right axle shafts in the housing;
 a cage rotatable in the housing about the major axis;
 an outer ring gear on the cage to enable torque to be applied to the cage so as to rotate the cage about the major axis;
 gearing within the cage for transferring torque from the cage to the left and right axle shafts and for accommodating variances in angular velocity between the left and right axle shafts;
 a left torque diverter for diverting torque from the cage to left axle shaft while bypassing the gearing; and
 a right torque diverter for diverting torque from the cage to the right axle shaft while bypassing the gearing;
 each torque diverter including a plurality of gears between the cage and its axle shaft and a magnetic particle brake for effecting, when activated, the transfer of torque through the plurality of gears;
 whereby the torque transferred to the left and right axle shafts may be vectored.

16. A differential according to claim 15 wherein each torque diverter includes a primary planetary set having a ring gear on the cage, a sun gear on one of the axle shafts, planet gears between the ring and sun gears, a carrier providing axes about which the planetary gears rotate, and a brake that resists rotation of the carrier.

17. A differential according to claim 15 wherein each torque diverter also includes a secondary planetary set having a ring gear mounted on the housing, a sun gear, and planet gears, with the axes of rotation for the planet gears being provided by the carrier; and wherein the brake is located between the housing and the sun gear of the secondary planetary set.

18. A differential according to claim 16 wherein the ring and sun gears of the primary planetary sets are beveled.

* * * * *